United States Patent
Igarashi et al.

(10) Patent No.: US 11,143,870 B2
(45) Date of Patent: Oct. 12, 2021

(54) DISPLAY APPARATUS AND DISPLAY METHOD

(71) Applicant: Ricoh Company, Ltd., Tokyo (JP)

(72) Inventors: Norikazu Igarashi, Kanagawa (JP); Shigenobu Hirano, Kanagawa (JP); Yasuo Katano, Kanagawa (JP); Kenji Kameyama, Kanagawa (JP); Takashi Maki, Kanagawa (JP); Yuuto Gotoh, Kanagawa (JP); Satomi Tanaka, Kanagawa (JP); Shiroh Ikegami, Tokyo (JP); Ikue Kawashima, Kanagawa (JP); Qing Liang, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 192 days.

(21) Appl. No.: 16/476,339

(22) PCT Filed: Feb. 15, 2018

(86) PCT No.: PCT/JP2018/005152
§ 371 (c)(1),
(2) Date: Jul. 8, 2019

(87) PCT Pub. No.: WO2018/151183
PCT Pub. Date: Aug. 23, 2018

(65) Prior Publication Data
US 2019/0353908 A1 Nov. 21, 2019

(30) Foreign Application Priority Data

Feb. 17, 2017 (JP) .............................. JP2017-027638
Feb. 7, 2018 (JP) .............................. JP2018-020152

(51) Int. Cl.
*G02B 27/01* (2006.01)
*G02F 1/163* (2006.01)

(52) U.S. Cl.
CPC ......... *G02B 27/0172* (2013.01); *G02F 1/163* (2013.01); *G02B 2027/0118* (2013.01); *G02B 2027/0178* (2013.01); *G02F 2201/18* (2013.01)

(58) Field of Classification Search
CPC ........ G02F 2201/18; G02F 1/163; G02F 1/15; G02B 27/0172; G02B 27/017; G02B 27/01; G02B 2027/0118; G02B 2027/0178

(Continued)

(56) References Cited

U.S. PATENT DOCUMENTS 5,572,343 A 11/1996 Okamura et al.
10,156,896 B2* 12/2018 Lee .......................... G06F 1/163

(Continued)

FOREIGN PATENT DOCUMENTS

CN 1761908 A 4/2006
CN 104520753 A 4/2015

(Continued)

OTHER PUBLICATIONS

International Search Report and Written Opinion dated May 15, 2018 in PCT/JP2018/005152 filed on Feb. 15, 2018.

(Continued)

*Primary Examiner* — William R Alexander
(74) *Attorney, Agent, or Firm* — Xsensus LLP (57) ABSTRACT

A display apparatus that enhances a response speed while suppressing reduction in durability even when the transmittance control is performed. The display apparatus includes a display, a plurality of light adjustment devices, and a controller. The display is configured to be attached to a head of a user to display information to the user. Each of the plurality of light adjustment devices is configured to change a transmittance to adjust an intensity of light incident from outside. The controller is configured to independently control the (Continued)

transmittances of the plurality of light adjustment devices separately from each other.

6 Claims, 10 Drawing Sheets

(58) Field of Classification Search
USPC .......................................................... 359/275
See application file for complete search history.

(56) References Cited

U.S. PATENT DOCUMENTS

| | | | |
|---|---|---|---|
| 10,816,798 B2* | 10/2020 | Travers | G02B 6/00 |
| 2015/0109651 A1* | 4/2015 | Branda | B32B 17/10633 |
| | | | 359/238 |
| 2015/0370071 A1 | 12/2015 | Alton et al. | |
| 2016/0202753 A1* | 7/2016 | Lee | G02B 27/0093 |
| | | | 345/8 |
| 2017/0038593 A1* | 2/2017 | Travers | G02B 6/0001 |
| 2017/0184894 A1 | 6/2017 | Hayashi et al. | |
| 2017/0235203 A1 | 8/2017 | Yamamoto et al. | |
| 2017/0315357 A1 | 11/2017 | Katano et al. | |
| 2017/0328733 A1 | 11/2017 | Gotoh et al. | |
| 2017/0345391 A1 | 11/2017 | Usui et al. | |

FOREIGN PATENT DOCUMENTS

| | | |
|---|---|---|
| CN | 105467694 A | 4/2016 |
| CN | 105828479 A | 8/2016 |
| CN | 106918963 A | 7/2017 |
| JP | 6-301065 | 10/1994 |
| JP | 2004-233908 | 8/2004 |
| JP | 2015-014784 | 1/2015 |
| JP | 2016-045463 | 4/2016 |
| JP | 2016-130838 | 7/2016 |
| JP | 2016-139116 | 8/2016 |
| JP | 2016-220042 | 12/2016 |
| JP | 2017-097098 | 6/2017 |
| JP | 2017-198825 | 11/2017 |
| JP | 2017-203952 | 11/2017 |
| JP | 2017-208070 | 11/2017 |
| JP | 2017-211425 | 11/2017 |
| JP | 2018-004756 | 1/2018 |
| JP | 2018-036358 | 3/2018 |
| JP | 2018-072612 | 5/2018 |
| JP | 2018-081280 | 5/2018 |
| WO | WO 2016/114130 A1 | 7/2016 |

OTHER PUBLICATIONS

Combined Chinese Office Action and Search Report dated Jan. 5, 2021 in Chinese Patent Application No. 201880011561.8, 7 pages.
Office Action dated Jun. 30, 2021 in Chinese Patent Application No. 201880011561.8, 7 pages.

* cited by examiner

| LIGHT INTENSITY DETECTED BY SENSOR (Lx) | WHEN TRANSMITTANCE OF LIGHT ADJUSTMENT FILTER IS DECREASED | | | | WHEN TRANSMITTANCE OF LIGHT ADJUSTMENT FILTER IS INCREASED | | | |
|---|---|---|---|---|---|---|---|---|
| | TRANS-MITANCE | LIGHT ADJUSTMENT FILTER 140a APPLIED VOLTAGE (V) | LIGHT ADJUSTMENT FILTER 140b APPLIED VOLTAGE (V) | APPLICATION TIME (sec.) | TRANS-MITANCE | LIGHT ADJUSTMENT FILTER 140a APPLIED VOLTAGE (V) | LIGHT ADJUSTMENT FILTER 140b APPLIED VOLTAGE (V) | APPLICATION TIME (sec.) |
| 0 to 6999 | 70% | | | | 70% | | | |
| | ↓ | 0.8 | 1.8 | 6 | ↑ | -0.6 | -1 | 5 |
| 7,000 to 24,999 | 10% | | | | 10% | | | |
| | ↓ | 1.2 | 1.7 | 6 | ↑ | -0.08 | -0.18 | 0.2 |
| 25,000 to 49,999 | 5% | | | | 5% | | | |
| | ↓ | 1.15 | 1.6 | 6 | ↑ | -0.08 | -0.18 | 0.2 |
| 50,000 to 100,000 | 3% | | | | 3% | | | |

DISPLAY APPARATUS AND DISPLAY METHOD

TECHNICAL FIELD

The present disclosure relates to a display apparatus and a display method.

BACKGROUND ART

There is a known head-mounted display apparatus worn on the head of a user to display information to be displayed in front of the eyes of the user while transmitting external light (see, e.g., PTL 1).

The head-mounted display apparatus is known to have a configuration in which external light is partially limited by the transmittance using a light adjustment filter in order to make it easy for the user to grasp an external situation and to make it easy to visually recognize the information to be displayed (see, e.g., PTL 2).

In a case where a variable-transmittance light adjustment filter is used, however, it is known that while there is an advantage of maintaining the visibility, repetitively changing the transmittance to a state of transmitting almost no external light (e.g., 1%) would gradually decrease the durability.

In order to overcome such a disadvantage, it is conceivable to lower the applied voltage used for light adjustment to reduce the load on the light adjustment filter, for example. This configuration, however, has another disadvantage of deterioration in the response speed.

CITATION LIST

Patent Literature

PTL 1: Japanese Patent No. 4366944
PTL 2: Japanese Unexamined Patent Application Publication No. 2016-045463

SUMMARY OF INVENTION

Technical Problem

In light of the above-described situation, an object of the present disclosure is to enhance the response speed while suppressing the reduction in durability even when the transmittance control is performed.

Solution to Problem

In an aspect of the present disclosure, there is provided a display apparatus that includes a display unit, a plurality of light adjustment devices, and a controller. The display unit is configured to be attached to a head of a user to display information to the user. Each of the plurality of light adjustment devices is configured to change a transmittance to adjust an intensity of light incident from outside. The controller is configured to control the transmittances of the plurality of light adjustment devices separately from each other.

Advantageous Effects of Invention

According to an aspect of the present disclosure, the display apparatus can enhance the response speed while suppressing the reduction in durability even when the transmittance control is performed.

DESCRIPTION OF EMBODIMENTS

Figure 1:
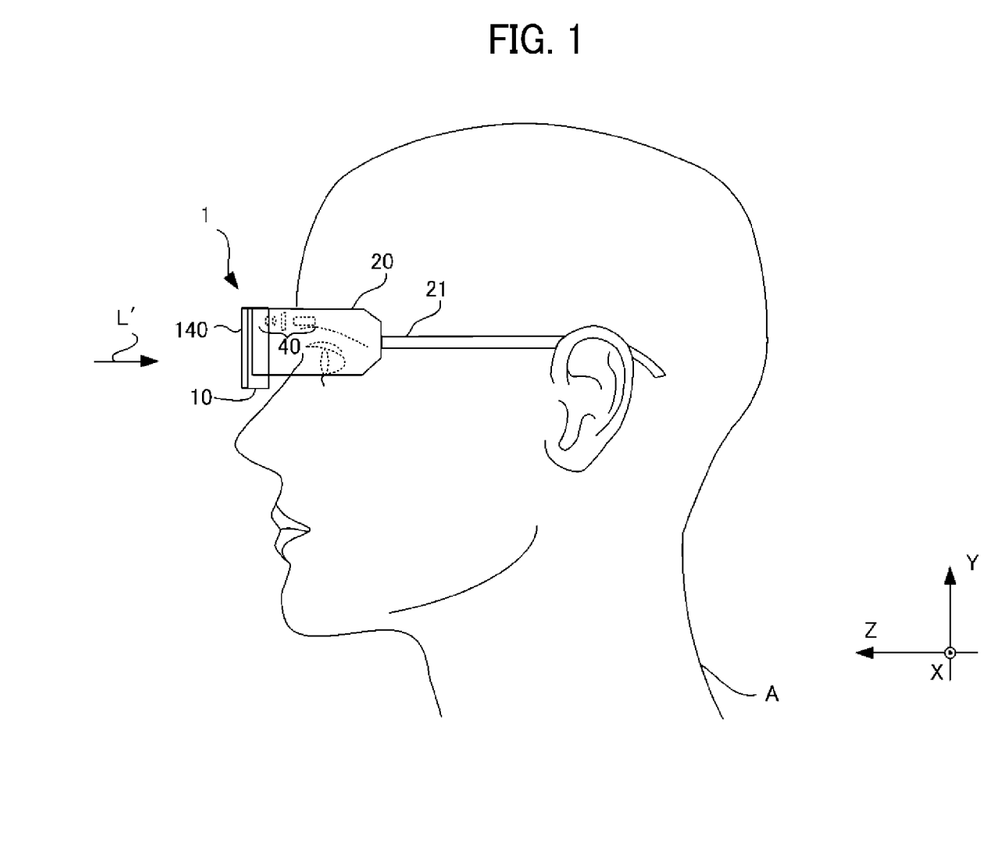
FIG. 1 is a view illustrating an exemplary display apparatus according to an embodiment of the present disclosure.
Figure 2:
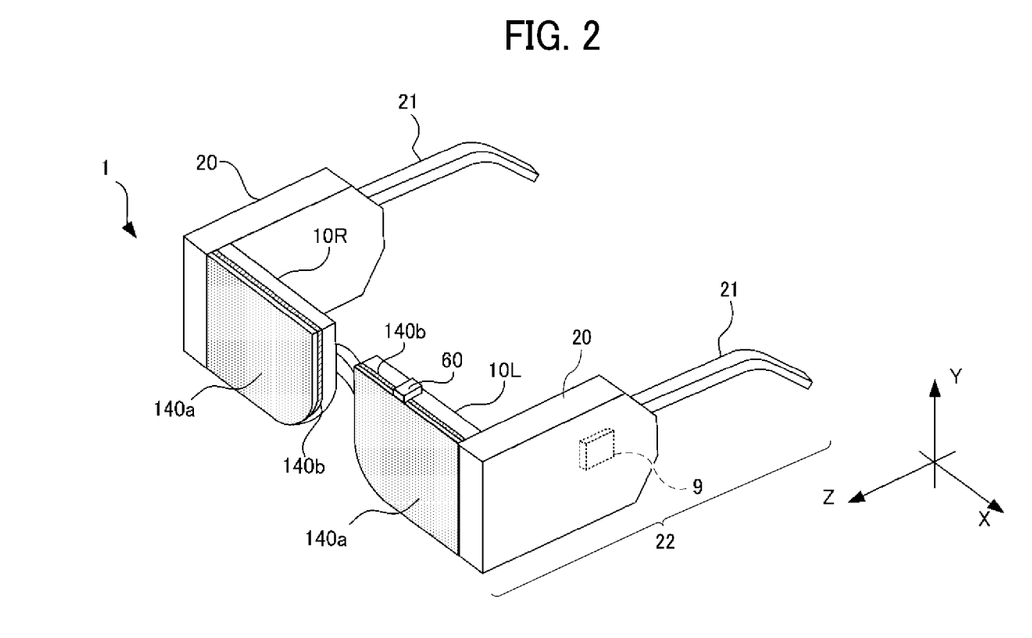
FIG. 2 is a view illustrating an exemplary configuration of a light adjustment filter according to an embodiment of the present disclosure.

FIGS. 1 and 2 illustrate an eyeglass-type display apparatus 1 as an exemplary head-mounted display according to a first embodiment of the present disclosure.

In the following, a forward direction of the user will be referred to as a Z-direction, and among the directions perpendicular to the Z-direction, a vertically upward direction will be referred to as a Y direction, and a horizontal direction perpendicular to both the Z-direction and the Y-direction will be referred to as an X direction.

The display apparatus 1 includes a frame portion 20 being an eyeglass-shaped housing to be attached to the head of a user A, a lens unit 10 to be arranged in front of each of the eyes of the user A when worn and forming a pair of display units. In the following, the lens unit arranged on the left eye side of the user A when worn will be referred to as a left-side lens unit 10L and the lens unit arranged on the right eye side as a right side lens unit 10R in a case of distinguishing between them in particular.

Figure 3:
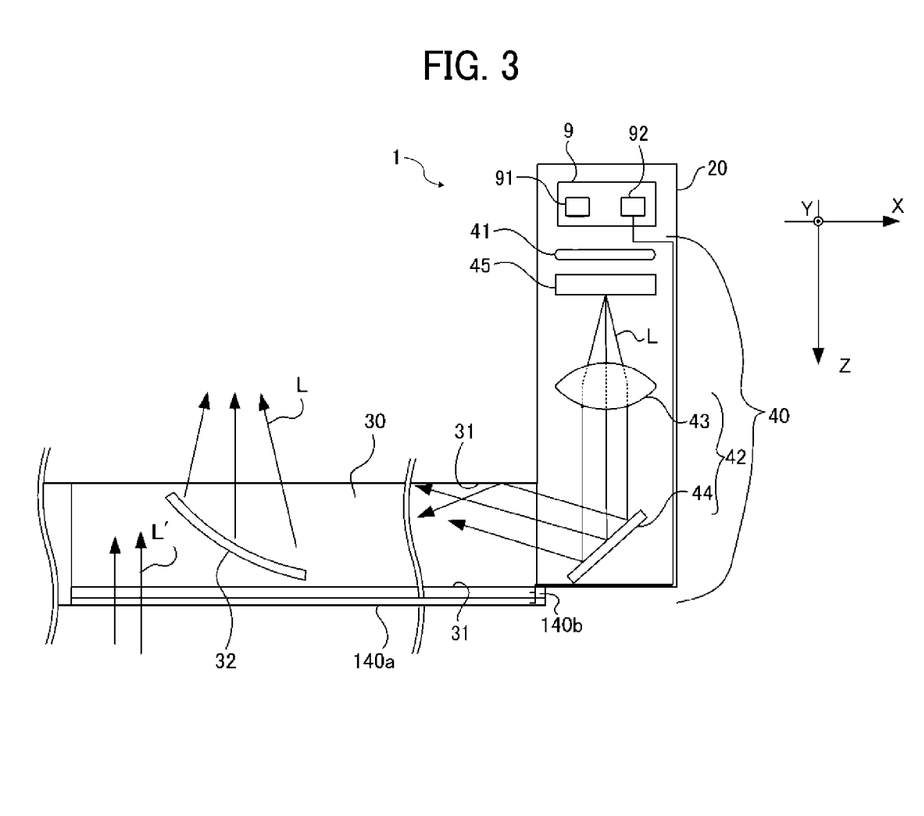
FIG. 3 is a diagram illustrating an exemplary projection light path in the display apparatus illustrated in FIG. 1.

As illustrated in FIG. 3, the display apparatus 1 includes an optical waveguide unit 30 secured to each of the lens units 10 and an image projection unit 40 to project an image toward each of the left and right eyes of the user A through the optical waveguide unit 30.

The display apparatus 1 includes two light adjustment filters 140a and 140b as two light adjustment devices to change the transmittance to adjust the intensity of external light L' incident from outside, and includes a controller 9 to control the transmittances of the light adjustment filters 140a and 140b separately from each other.

In the present embodiment, one pair of the light adjustment filters 140a and 140b is arranged in each of the left-side lens unit 10L and the right side lens unit 10R. The filter arranged on an outer side as an incident side of the external light L' is referred to as the light adjustment filter 140a and the filter arranged on the user A side as a light emission side, that is, an inner side, is referred to as the light adjustment filter 140b.

The display apparatus 1 also includes a sensor 60 mounted above the lens unit 10 to detect the amount of light around the display apparatus 1.

The lens unit 10 is an acrylic resin lens to partially transmit the external light L'.

While the acrylic resin is used herein for the lens unit 10, the material may be other transparent materials such as polyvinyl chloride resin or a polycarbonate resin, a semi-transparent material, or the material to transmit specific wavelength band so as to partially transmit the external light L'. While the term "lens" is used here for the sake of convenience, the magnification in the present embodiment is 1× and the term includes a member without a function as an optical lens with typical refractive index.

The lens unit 10 is attached to the head of the user A to display projection light L from the image projection unit 40 to the user A, so as to function as a display unit.

The frame portion 20 has an eyeglass shape and includes a pair of right and left supports 21 as a temple of the eyeglasses, that is, a portion to fit the temporal portion of the user A, and a pair of left and right lens frames 22 supporting each of the lens unit 10.

The shape of the frame portion 20 is not limited to this configuration.

The support 21 incorporates the image projection unit 40 and the controller 9, and thus, the support 21 functions as a housing of these components.

A pair of right and left lens frames 22 each includes a frame portion 20 and a support 21. The right and left lens frames 22 are coupled to the right-side lens unit 10R and the left-side lens unit 10L, respectively. The frame portion 20 includes the image projection unit 40 and the controller 9. The support 21 is attached to the frame portion 20, to mount on an ear of the user A. The shape of the lens frames 22 is not limited to the above-described configuration.

The optical waveguide unit 30 is an acrylic light guide secured to the lens unit 10 as illustrated in FIG. 3. In the present embodiment, the optical waveguide unit 30 is secured to the lens unit 10 formed of acrylic resin so as to be fitted.

While the projection light L incident on the inside of the optical waveguide unit 30 is schematically illustrated as a straight line in FIG. 3, the projection light L in practice is transmitted with little attenuation while undergoing repetitive reflection on an inner wall surface 31.

While the optical waveguide unit 30 is desirably formed of a same member as a transparent member, more desirably as the lens unit 10, it is not limited to such a configuration.

The optical waveguide unit 30 has a half mirror 32 arranged at an end of an optical path, that is, on the center side of the user's head. The member is not limited to the half mirror 32 and a reflecting member using a hologram or a member having a multi-stage half mirror may alternatively be used as long as the member transmits and reflects the light.

While the optical waveguide unit 30 may be parallel to the surface of the lens unit 10, it is more desirable to have an inclination of 1° to 3° instead of being parallel so as to increase the likelihood of occurrence of the total reflection of the optical waveguide unit 30.

The half mirror 32 is a portion to transmit the external light L' while reflecting the projection light L from the optical waveguide unit 30 toward the back side of the display apparatus 1 and emitting the projection light L toward the direction of the eyes of the user of the display apparatus 1. The image projection unit 40, the optical waveguide unit 30, and the half mirror 32 are representative examples of optical members for guiding an image to the eyes of the user.

The image projection unit 40 includes a light emission source 41 to emit the projection light L, a projection optical system 42 to collect the projection light L from the light emission source 41 to allow the projection light L to be incident on the optical waveguide unit 30, and an image display unit 45 to display image information and text information to be projected.

The light emission source 41 may include LED light, laser light, monochromatic light source, and a halogen lamp.

The projection optical system 42 is an optical system including optical devices such as one or more optical lenses 43 and a mirror 44, and transmits the projection light L to which image information has been applied, to the optical waveguide unit 30.

The image display unit 45 is controlled to determine image information to be applied to the projection light L selected by an external apparatus such as a computer or the controller itself and controlled to apply the image information. Controlling image information indicates operation of forming an image on a device such as a liquid crystal device to apply the image information to the projection light L to be transmitted through the liquid crystal device.

The image displayed on the image display unit 45 can be supplied from outside of the display apparatus 1 by wire or wirelessly, for example. Alternatively, the display apparatus 1 may include a removable storage (memory card, or the like) so as to supply images via the storage.

The sensor 60 is a luminance sensor or an illuminance sensor serves as a light intensity detector to measure the luminance or the illuminance to determine the brightness around the display apparatus 1. In the present embodiment, a photodiode is used as the sensor 60.

When it is assumed that the sensor 60 is used outdoors, it is desirable that the sensor 60 can measure illuminance of 80000 Lx or more.

The controller 9 is an electronic device including a central processing unit (CPU), a read only memory (ROM), and a random access memory (RAM).

The controller 9 also includes a transmittance controller 91 to control the transmittances of the light adjustment filters 140a and 140b separately from each other, and a power supply 92 to apply a voltage to the light adjustment filters 140a and 140b on the basis of a signal from the transmittance controller 91 The transmittance controller 91 sets the transmittance of each of the light adjustment filters 140a and 140b on the basis of the intensity of the external light L' detected by the sensor 60.

For example, as illustrated in Table 1, the intensity of the external light L' detected by the sensor 60, the desired transmittance, the applied voltage and the application time are recorded beforehand as an adjustment tables to control the application time and the applied voltage.

For example, Table 1 indicates that in order to change the state from the transmittance 70% state to the 10% state, it would be sufficient to apply a voltage of 1.7 V for six seconds. Note that Table 1 describes the voltage application to the oxidizing electrode of the light adjustment filters 140a and 140b as a positive voltage, and the voltage application to the reducing electrode as a negative voltage.

TABLE 1

| LIGHT INTENSITY DETECTED BY SENSOR (Lx) | WHEN TRANSMITTANCE OF LIGHT ADJUSTMENT FILTER IS DECREASED | | | WHEN TRANSMITTANCE OF LIGHT ADJUSTMENT FILTER IS INCREASED | | |
|---|---|---|---|---|---|---|
| | TRANSMITTANCE | APPLIED VOLTAGE (V) | APPLICATION TIME (sec.) | TRANSMITTANCE | APPLIED VOLTAGE (V) | APPLICATION TIME (sec.) |
| 0 to 6999 | 70% ↓ | 1.7 | 6 | 70% ↑ | −1 | 5 |
| 7,000 to 24,999 | 10% ↓ | 1.55 | 6 | 10% ↑ | −0.2 | 0.2 |
| 25,000 to 49,999 | 5% ↓ | 1.5 | 6 | 5% ↑ | −0.2 | 0.2 |
| 50,000 to 100,000 | 3% | | | 3% | | |

According to the present embodiment, the power supply 92 applies a voltage to the light adjustment filters 140a and 140b.

The above-described display apparatus 1 can be used to allow the user to recognize an image by using a mechanism as follows.

First, the projection light L emitted from the light emission source 41 is transmitted through the image display unit 45, whereby image information is applied to the projection light L.

The projection light L passes through the projection optical system 42 to be incident on the optical waveguide unit 30, and while being reflected by the inner wall surface 31 of the optical waveguide unit 30, the projection light L hits the half mirror 32 so as to be incident toward the eyes of the user. The user recognizes the projection light L as an image displayed in the field of view, more specifically, a virtual image.

The user also visually recognizes the external light L' transmitted through the lens unit 10, and the light adjustment filters 140a and 140b.

Figure 4:
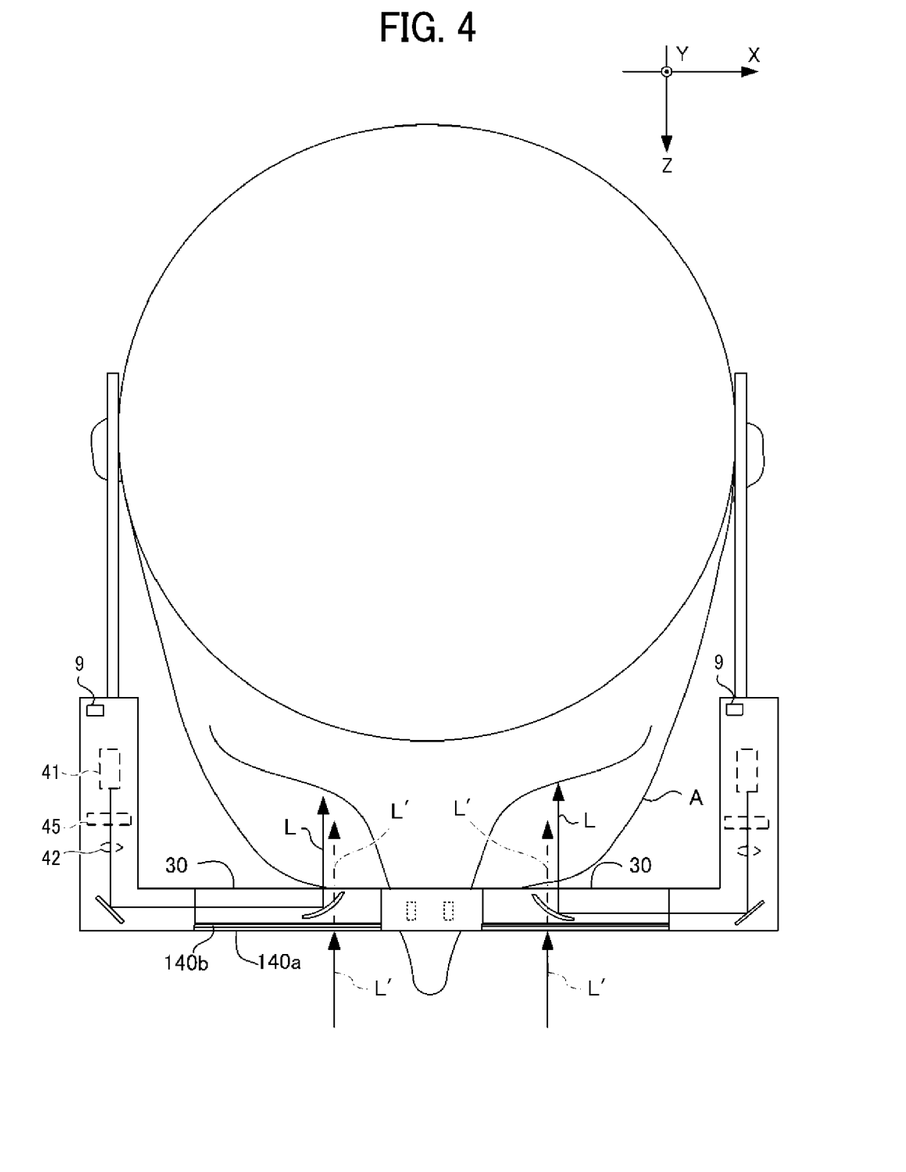
FIG. 4 is a diagram illustrating an example of a view obtained by wearing a display apparatus.

Accordingly, the information given by the external light L' and image information P applied by the projection light L overlap and displayed in the field of view of the user.

The display apparatus 1 controls the transmittance of the light adjustment filters 140a and 140b to adjust a difference in the intensity between the external light L' and the projection light L to enhance the visibility.

As described above, the light adjustment filters 140a and 140b change the transmittance of the external light L' as incident light to the display apparatus 1 from outside by electrical control so as to adjust the intensity of the external light L' to reach the eyes of the user A. In other words, the plurality of light adjustment filters 140a and 140b is arranged in a direction of incidence of the external light L', and the external light L' passes through the plurality of light adjustment filters 140a and 140b to change the light quantity.

The light adjustment filters 140a and 140b are formed with electrochromic devices, for example. The electrochromic device can be formed on a glass substrate or a plastic substrate transparent to visible light. Using an electrochromic device as the light adjustment filters 140a and 140b enables the light adjustment filters 140a and 140b to change the transmittance when the brightness in the surrounding environment changes, making it possible to maintain a good visibility state at a constant level.

Now, an exemplary structure of the light adjustment filters 140a and 140b will be described. Due to the similarity in structures in the light adjustment filters 140a and 140b, the filters will be described as the light adjustment filter 140 with no distinction.

Figure 5:
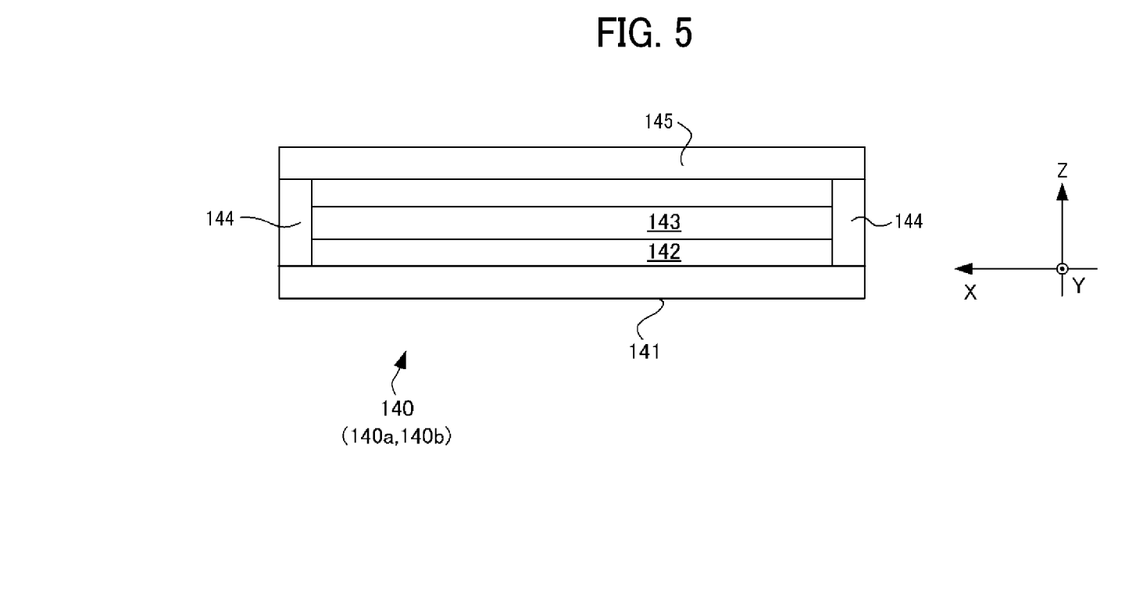
FIG. 5 is a diagram illustrating an exemplary layer configuration of a light adjustment filter.

As illustrated in FIG. 5, the light adjustment filter 140 may have a cell structure including a display substrate 141 on which a titanium oxide particle film 142 and a display layer 143 are formed, and on top of which a counter substrate 145 is bonded via a spacer 144 of about 10 μm. In the cell structure, for example, 1-ethyl-3-methylimidazolium tetracyanoborate is enclosed as an electrolytic solution.

As the display substrate 141, for example, it is allowable to use a glass substrate of about 60 mm×60 mm in which a conductive layer is formed by forming ITO by sputtering. For example, the titanium oxide particle film 142 is formed by applying a titanium oxide nanoparticle dispersion liquid (SP 210 made by Showa Titanium Co., Ltd.) on a top surface of the conductive layer of the display substrate 141 by spin coating, or the like, and annealing at a temperature of about 120° C. for about 15 minutes.

For example, the display layer 143 is formed by applying a 1 wt % 2,2,3,3-tetrafluoropropanol solution of the compound represented by the following structural formula (Chemical formula 1 [Chem. 1]) on the titanium oxide particle film 142 as a coating liquid by spin coating, or the like. Then, by performing annealing at a temperature of about 120° C. for about 5 minutes, it is possible to form the display layer 143 by adsorbing the electrochromic compound on the surface of the titanium oxide particles forming the titanium oxide particle film 142. As the counter substrate 145, for example, it is possible to use a glass substrate with ITO spin-coated with a coloring matter to develop a color by oxidation.

Alternatively, for example, the light adjustment filter 140 may be fabricated independently from other components and may be a structure detachably attached to the lens unit 10. This enables the light adjustment filter 140 to be replaced in accordance with the degree of wear, maintaining the display apparatus 1 in a state to allow comfortable viewing all the time.

[Chem. 1]

In use of such an electrochromic device, it is generally known that repeatedly changing the minimum transmittance to 10% or less would deteriorate the durability.

In addition, there are other issues such as degradation due to ultraviolet rays or visible light and enhancement of repetitive durability with the number of times of voltage application.

According to the present embodiment, each of the lens units 10 includes each of the light adjustment filters 140a and 140b as light adjustment devices.

This configuration enables adjustment of the intensity of the external light L', making it possible to recognize the projected image with higher accuracy.

Meanwhile, when the intensity of the external light L' is high in particular, such as when going outdoors, when sunshine came from the cloudy sky in the use outdoors, it is desirable to keep the transmittance of the external light L' to a level as low as 10% or less.

To achieve this, the present embodiment uses an electrochromic device having a wider transmittance selectable region in comparison to a liquid crystal device, or the like, as the light adjustment device.

Figure 6:
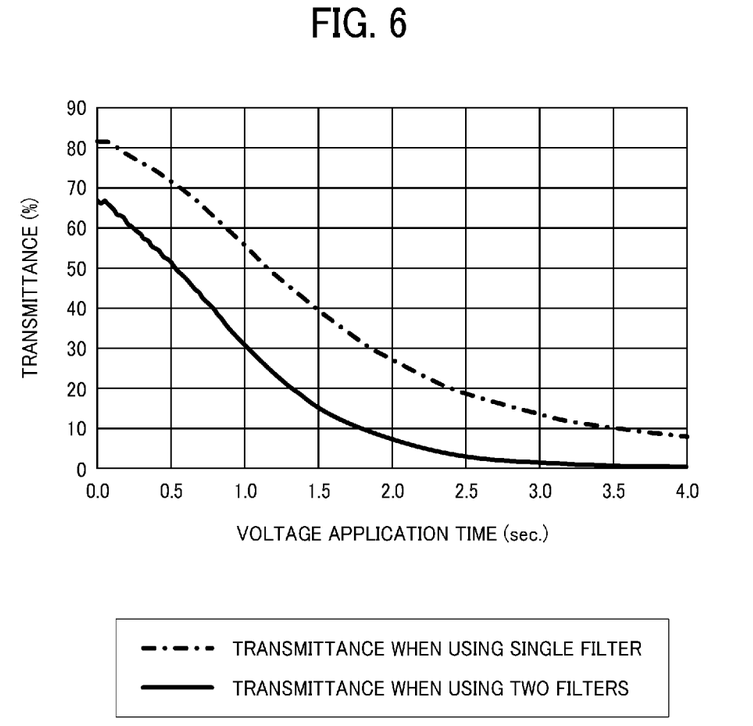
FIG. 6 is a graph illustrating an exemplary time characteristic of transmittance control of a light adjustment filter.

In general, however, the transmittance has a time characteristic as indicated by the one-dot chain line in FIG. 6 even with the use of an electrochromic device. Due to this, achieving an extremely low transmittance, for example, 1% would take a long time (≈ long voltage application time).

Furthermore, while increasing the applied voltage or the like, might be conceivable to handle this issue, for example, repeatedly changing the transmittance would cause a disadvantage of deterioration in the repetitive durability. In order to enhance the repetitive durability, it is desirable to achieve a configuration to shorten the voltage application time while suppressing the applied voltage.

The present embodiment uses the plurality of light adjustment filters 140a and 140b to suppress the transmittance of each of the light adjustment filters 140a and 140b to a region of 80% to 10%, so as to enhance the time responsiveness while suppressing the deterioration in repetitive durability.

Furthermore, by simultaneously driving the plurality of (two in the present embodiment) light adjustment filters 140a, 140b, as illustrated by the solid line in FIG. 6, a desired transmittance can be achieved at a higher speed than a case of using a single light adjustment filter, with further enhancement of the time responsiveness. The solid line in FIG. 6 illustrates the total transmittance in a case where the two light adjustment filters 140 having the voltage-time characteristic indicated by the one-dot chain line are overlaid to perform voltage application with the same magnitude and the same time.

Figure 7:
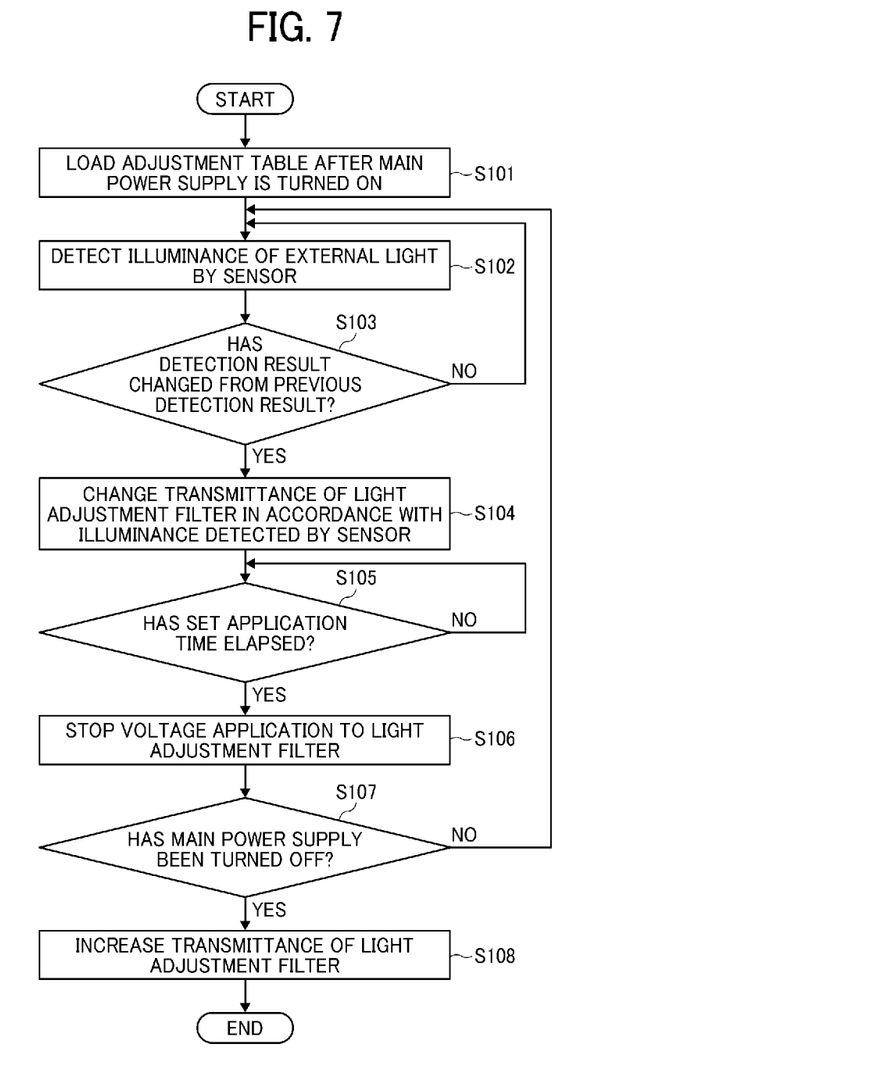
FIG. 7 is a flowchart illustrating an exemplary operation method for performing transmittance control of a display apparatus.

The control of the light adjustment filters 140a and 140b will be described with reference to FIG. 7.

When the display apparatus 1 is activated and the main power supply is turned on, the display apparatus 1 loads an adjustment table being a combination table including the intensity of the preset external light L' and the transmittance of each of the light adjustment filters 140a and 140b from the ROM as the storage of the controller 9 (step S101).

The sensor 60 detects the intensity of the external light L' (step S102).

The transmittance controller 91 determines whether the intensity detected in step S102 by the sensor 60 has changed (step S103).

In step S103, on the condition that the intensity detected by the sensor 60 has varied, the transmittance controller 91 calculates the time and the magnitude of the applied voltage on the basis of the adjustment table of Table 1 to change the transmittance of each of the light adjustment filters 140a and 140b (step S104).

The present embodiment starts application of voltages simultaneously to the light adjustment filters 140a and 140b. Therefore, compared with the case of suppressing the transmittance of the external light L' to 1% using a single light adjustment filter, it is possible to suppress the transmittance at higher speed with the equal applied voltage, as illustrated in FIG. 6.

Shortening the voltage application time achieves reduction of the load on each of the light adjustment filters 140a and 140b, making it possible to enhance the repetitive durability.

Each of the light adjustment filters 140a and 140b in the present embodiment is an electrochromic device, and thus, maintains the previous transmittance even when the applied voltage is stopped. Therefore, when the intensity of the external light L' has not changed in step S103, the processing returns to step S102 and to continue the processing.

The controller 9 determines whether a voltage has been applied for a predetermined application time at a predetermined applied voltage on the basis of the adjustment table (step S105). In step S105, when it is determined that a desired transmittance has been obtained by the predetermined application time and applied voltage, the transmittance controller 91 stops the application of voltage to the light adjustment filters 140a and 140b to determine the transmittance (step S106).

The operation procedures from step S102 to step S106 are repeatedly performed until the main power supply of the display apparatus 1 is turned off (step S107). Moreover, provided that the main power supply is turned off in the present embodiment, the transmittance of the light adjustment filters 140a and 140b is enhanced (step S108), and the processing ends in a state of high transmittance.

As described above, the display apparatus 1 includes the lens unit 10 worn on the head of the user A to display information to the user A, and the two light adjustment filters 140a and 140b to change the transmittance to adjust the intensity of the external light L', incident from the outside.

In addition, the display apparatus 1 includes the transmittance controller 91 to control the transmittances of the light adjustment filters 140a and 140b separately from each other.

With such a configuration, the response speed is enhanced while suppressing the reduction in durability even when the transmittance control is performed.

Moreover, the application of the voltage is started simultaneously to the light adjustment filter 140a and the light adjustment filter 140b in the present embodiment, so as to change the transmittance simultaneously.

This configuration can reduce the time to reach the predetermined transmittance and thus, reduces the load on the light adjustment filters 140a and 140b, leading to the enhancement of repetitive durability.

This also increases the speed at the time to reach the transmittance set by the display apparatus 1.

Next, the following is a case as a second embodiment of the present disclosure, where adjustment tables are set to achieve mutually different transmittances individually for the light adjustment filters 140a and 140b.

In the following description, the similar components as the components of the first embodiment are denoted by the same reference numerals, and the description of the components is appropriately omitted.

In the description according to the present embodiment, the light adjustment filter 140 arranged on the outer side along the incident direction of the external light L' (upstream side in the incident direction of the external light L') is referred to as the light adjustment filter 140a, and the light adjustment filter arranged on the inner side is referred to as the light adjustment filter 140b.

As illustrated in Table 2, the light adjustment filter 140a is a variable light adjustment device capable of controlling the transmittance in four stages of 80%, 40%, 20%, and 10%.

Similarly, the light adjustment filter 140b is a variable light adjustment device capable of controlling the transmittance in five stages of 80%, 50%, 30%, 15%, and 10%. Voltage is applied by the voltage application member such as the power supply 92 independently on the basis of signals from the transmittance controller 91 to the light adjustment filters 140a and 140b so as to change the transmittance.

TABLE 2

| DESIRED TRANSMITTANCE | TRANSMITTANCE OF LIGHT ADJUSTMENT FILTER 140a | TRANSMITTANCE OF LIGHT ADJUSTMENT FILTER 140b |
| --- | --- | --- |
| 64% | 80% | 80% |
| 40% | 80% | 50% |
| 32% | 40% | 80% |
| 24% | 80% | 30% |
| 20% | 40% | 50% |
| 16% | 20% | 80% |

TABLE 2-continued

| DESIRED TRANSMITTANCE | TRANSMITTANCE OF LIGHT ADJUSTMENT FILTER 140a | TRANSMITTANCE OF LIGHT ADJUSTMENT FILTER 140b |
| --- | --- | --- |
| 12% | 40% | 30% |
| 8% | 10% | 80% |
| 6% | 20% | 30% |
| 5% | 10% | 50% |
| 4% | 40% | 10% |
| 3% | 10% | 30% |
| 2% | 20% | 10% |
| 1.5% | 10% | 15% |
| 1.0% | 10% | 10% |

It is allowable to configure such that each of the light adjustment filters 140a and 140b steples sly changes the transmittance to any value. Setting the transmittance in multiple level variation of predetermined n stages, however, would simplify the configuration of the controller 9 to reduce the load of the light adjustment filters 140a and 140b and thus, desirable.

Furthermore, setting the selectable transmittance level variations differently between the light adjustment filter 140a arranged on the outer side and the light adjustment filter 140b arranged on the inner side would increase the number of level variations achievable by the combination of the light adjustment filters 140a and 140b, as illustrated in Table 2.

Meanwhile, the external light L' of outdoors includes visible light and rays with a relatively short wavelength such as ultraviolet rays. The light in a short wavelength region such as ultraviolet rays in particular is known to adversely affect or even degrade the light adjustment filter when the light is absorbed by the filter.

In addition, the lower the transmittance, the higher the likelihood of generation of this absorption.

Figure 8:
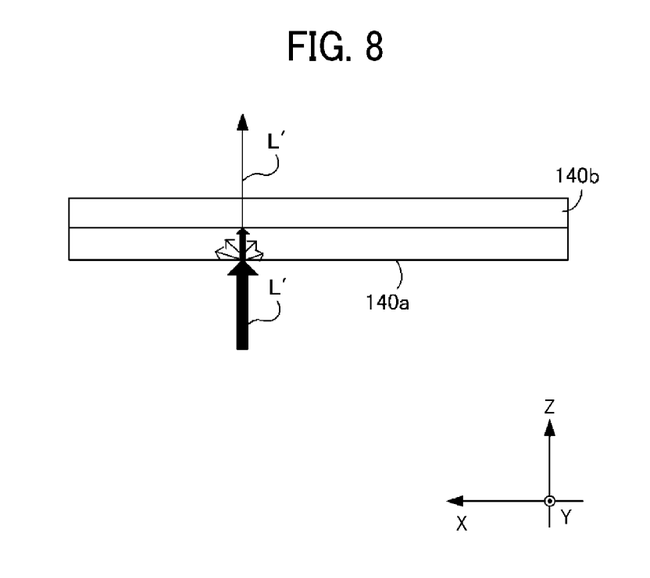
FIG. 8 is a diagram schematically illustrating transmission of light in a plurality of light adjustment filters.

That is, as schematically illustrated in FIG. 8, when the light adjustment filters 140a and 140b having the same transmittance are arranged along the incident direction of the external light L', light incidence occurs onto the light adjustment filter 140a arranged on the outer side in a state where the intensity of the external light L' is not suppressed, having relatively high level of influence.

In contrast, the external light L' incident onto the light adjustment filter 140b arranged on the inner side has the light amount suppressed by the light adjustment filter 140a, having relatively low level of influence.

That is, simply arranging the light adjustment filter 140a and the light adjustment filter 140b would generate a state where the light adjustment filter 140a is more susceptible to the external light L'.

To cope with this, the second embodiment provides the plurality of light adjustment filters 140a and 140b with adjustment tables for forming different light adjustment stages.

The adjustment table according to the second embodiment defines the transmittance of the light adjustment filter 140a arranged on the outer side and the transmittance of the light adjustment filter 140b arranged on the inner side, for the desired transmittances.

This configuration enables the light adjustment filters 140a and 140b to take mutually different light adjustment stages. By combining the light adjustment stages for each of the light adjustment filters 140a and 140b, it is possible to control the light to the light adjustment stages of the number of combinations of the adjustment tables, or more.

Moreover, in the present embodiment, the transmittance of the light adjustment filter 140a arranged in the outer side in the incident direction of the external light L' out of the plurality of light adjustment filters 140a and 140b is lower than the transmittance of the light adjustment filter 140b arranged in the inner side.

With such a configuration, the light adjustment filter 140a arranged on the outer side where the intensity of the external light L' is relatively high can suppress the influence of the external light L' by the degree of high transmittance.

With such a configuration, the influence of the external light L' on the light adjustment filter 140b arranged on the inner side and the light adjustment filter 140a arranged on the outer side is uniformized, making it possible to suppress the load on the light adjustment filters 140a and 140b.

In the present embodiment, the light adjustment filters 140a and 140b have a plurality of light adjustment stages with mutually different transmittances, and the transmittance is controlled by a combination of the light adjustment stages.

This configuration makes it possible to set more light adjustment stages with a simplified configuration than a case where same light adjustment stages are simply combined.

Figure 9:
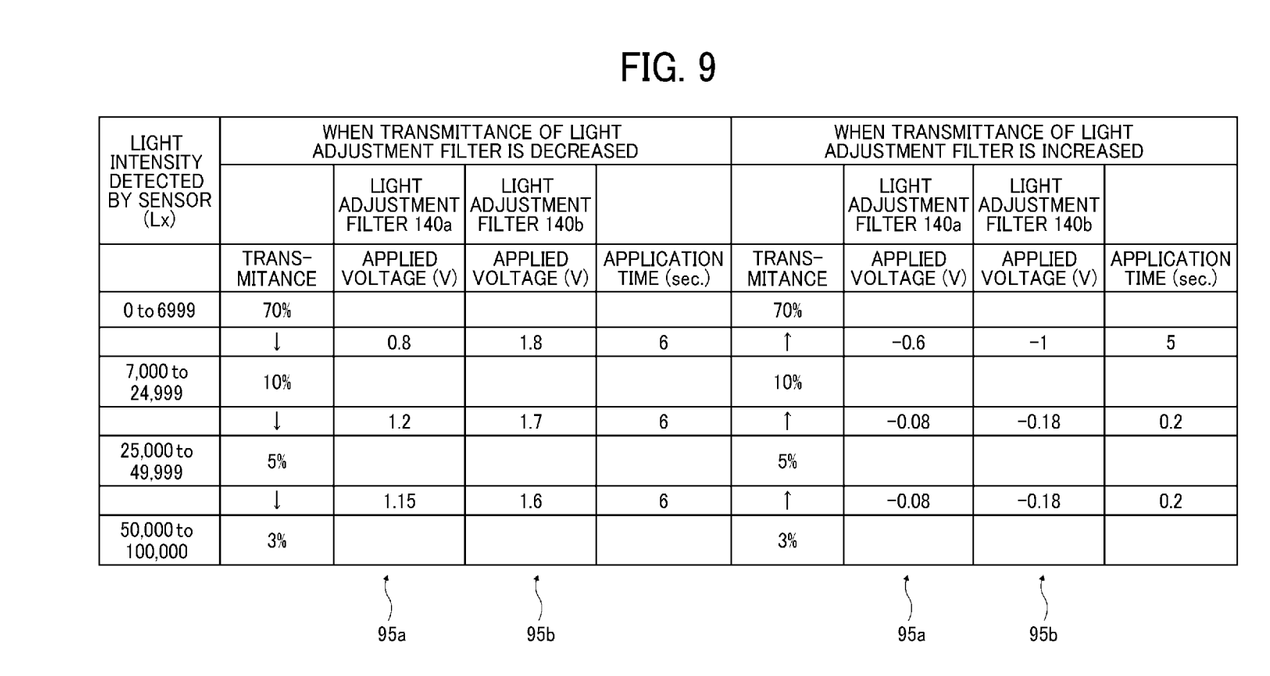
FIG. 9 is a chart of adjustment tables for the light adjustment filters in an embodiment of the present disclosure.

Next, the following is a case as a third embodiment of the present disclosure, where adjustment tables 95a and 95b for the light adjustment filters 140a and 140b are set as illustrated in FIG. 9.

In the present embodiment, the controller 9 has a function to select the adjustment tables 95a and 95b for the operation of the plurality of light adjustment filters 140a and 140b.

In the present embodiment, the light adjustment filters 140a and 140b are controlled so as to have mutually different transmittances, and the transmittances are switched on condition that the on-off of the main power supply of the display apparatus 1 is switched.

Specifically, the transmittance controller 91 includes the plurality of adjustment tables 95a and 95b corresponding to the light adjustment filters 140a and 140b, respectively, and the transmittance controller 91 switches the plurality of adjustment tables 95a and 95b by on-off of the display apparatus 1.

Such a control method will be described.

Figure 10:
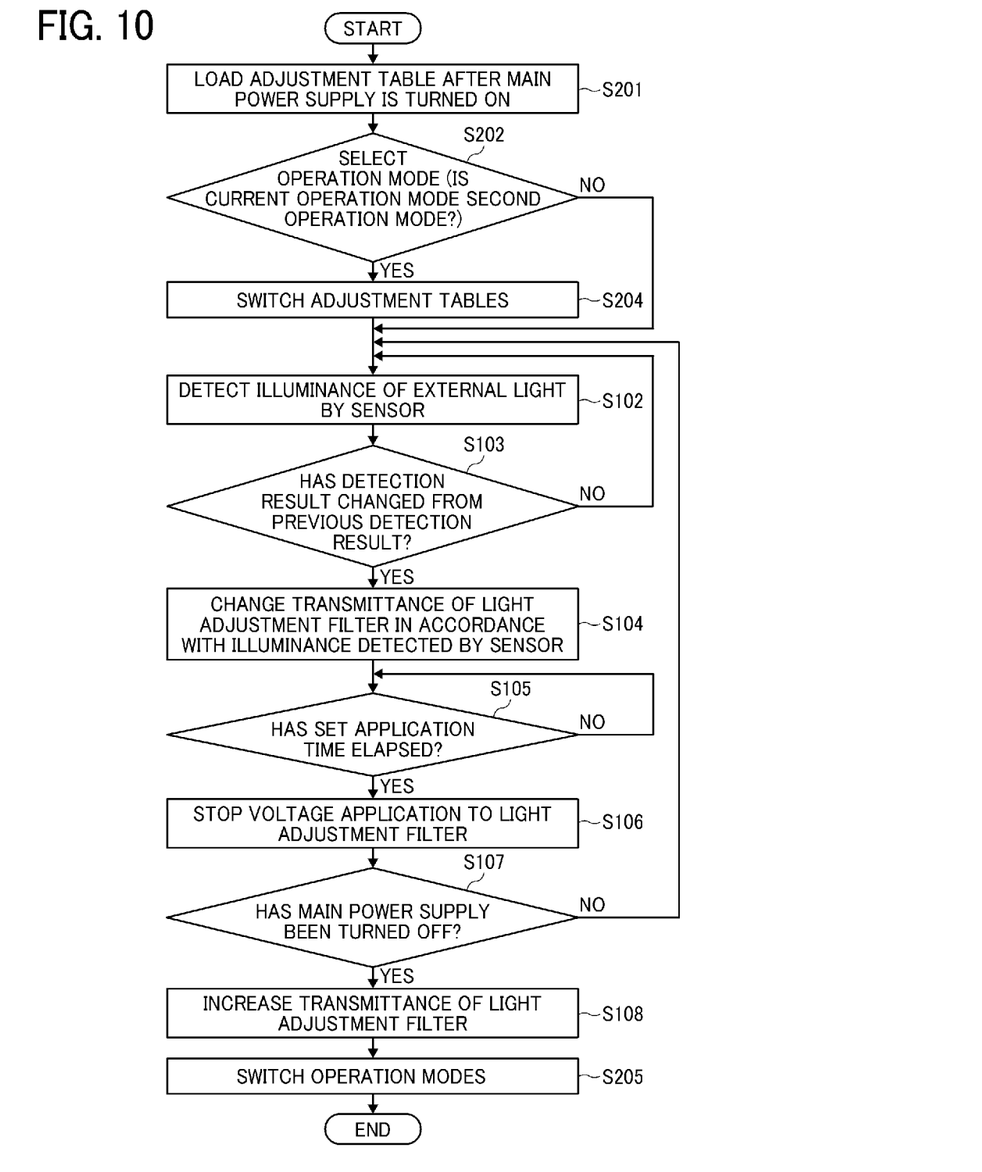
FIG. 10 is a flowchart illustrating another exemplary operation method for performing transmittance control of the display apparatus.

As illustrated in FIG. 10, when the main power supply of the display apparatus 1 is turned on, the controller 9 loads the adjustment table from the ROM (step S201).

The controller 9 also determines whether the current operation mode is a first operation mode or a second operation mode (step S202).

The first operation mode is a mode of setting the transmittance of the light adjustment filter 140a arranged on the outer side to a level greater than the level of the transmittance of the light adjustment filter 140b arranged on the inner side so as to suppress the degradation of the light adjustment filter 140a.

Similarly, the second operation mode is a mode of suppressing the degradation of the light adjustment filter 140b arranged on the inner side.

When it is determined in step S202 that the operation mode is the first operation mode, the transmittance controller 91 sets the transmittance of the light adjustment filter 140a in accordance with the adjustment table 95a and the sets the transmittance of the light adjustment filter 140b in accordance with the adjustment table 95b (step S203).

Similarly, when it is determined as the second operation mode, the transmittance controller 91 switches the adjustment tables of the light adjustment filters 140a and 140b with each other (step S204). That is, the transmittance of the light adjustment filter 140a is set in accordance with the adjustment table 95b, while the transmittance of the light adjustment filter 140b is set in accordance with the adjustment table 95a.

Then, the controller 9 controls the transmittance of the light adjustment filters 140a and 140b by operation similar to steps S102 to S108.

In step S107, when the controller 9 detects that the main power supply of the display apparatus 1 is turned off, the controller 9 switches from the current operation mode determined in step S202 to a different operation mode (step S205).

When the transmittance setting is completed in the first operation mode and the main power supply is turned off, and then the main power supply is turned on again to proceed to step S202, the display apparatus 1 starts to operate in the second operation mode. That is, the transmittance controller 91 sets the transmittance of the light adjustment filter 140a in accordance with the adjustment table 95b, while setting the transmittance of the light adjustment filter 140b in accordance with the adjustment table 95a.

At this time, the transmittance of the light adjustment filter 140a is lower than the transmittance of the light adjustment filter 140b.

The degradation generated by ultraviolet rays or the like contained in the external light L' is alternately received by the light adjustment filter 140a and the light adjustment filter 140b, and thus, the load of the external light L' on the light adjustment filter 140a and the light adjustment filter 140b is distributed. This configuration enhances the repetitive durability.

While the present embodiment uses a configuration in which the switching between the first operation mode and the second operation mode is performed by turning on-off the main power supply of the display apparatus 1, the present disclosure is not limited to this configuration.

For example, the light adjustment filter 140a arranged on the outer side is more susceptible to degradation by the external light L', and thus, setting an availability factor of the light adjustment filter 140b arranged on the inner side to a higher level would extend the lifetime of the light adjustment filters 140a and 140b as a whole.

Alternatively, it is allowable to provide a detector to detect the degree of durability deterioration due to the external light L' in the light adjustment filters 140a and 140b, and to switch the adjustment tables on the condition that predetermined durability deterioration is detected, or still another method may be employed.

Moreover, as illustrated in the second embodiment, different adjustment tables may be used to switch the adjustment tables.

In the first to third embodiments, the transmittance is varied by the magnitude and the time of the applied voltage.

This configuration enables the transmittance of the light adjustment filters 140a and 140b to be easily varied, leading to the reduction in the loads on the light adjustment filters 140a and 140b and the enhancement in durability.

While the desirable embodiments have been described in detail above, the present disclosure is not limited to the above-described embodiments, and various modifications and substitutions may be made to the above-described embodiments without departing from the scope described in the appended claims.

For example, the first to third embodiments correspond to the case of using the binocular image display apparatus. Alternatively, it is allowable to use the same configuration for an image display apparatus to perform display of image information by projection light to one of the eyes.

REFERENCE SINGS LIST

1 Display apparatus
10 Display Unit (Lens unit)
20 Frame (Housing)
21 Support (Holder)
22 Lens frame
40 Image projection unit
140 Light adjustment device (Light adjustment filter) (Electrochromic device)
A User

The invention claimed is:

1. A display apparatus, comprising:
a display configured to be attached to a head of a user to display information to the user;
a plurality of light adjustment devices, each configured to change a transmittance to adjust an intensity of light incident from outside, the plurality of light adjustment devices being arranged in a direction of incidence of the light incident from the outside; and
a controller configured to control the transmittances of the plurality of light adjustment devices separately from each other, wherein the controller is further configured to simultaneously change the transmittances of the plurality of light adjustment devices by controlling a time and a magnitude of a voltage applied to the plurality of light adjustment devices, based on a predetermined adjustment table.

2. The display apparatus according to claim 1,
wherein, among the plurality of light adjustment devices, a first light adjustment device on an outer side in an incident direction of the light has a transmittance higher than a transmittance of a second light adjustment device on an inner side in the incident direction of the light.

3. The display apparatus according to claim 1,
wherein the controller is further configured to control the plurality of light adjustment devices to have different transmittances from each other, and switch the different transmittances with each other at predetermined intervals.

4. The display apparatus according to claim 1,
wherein the plurality of light adjustment devices have a plurality of mutually different light adjustment stages, and
wherein the controller is further configured to control the transmittances of the plurality of light adjustment devices by a combination of the plurality of mutually different light adjustment stages.

5. The display apparatus according to claim 1, further comprising a light intensity detector to detect the intensity of the light,
wherein the controller is further configured to control the transmittances of the plurality of light adjustment devices in accordance with the intensity detected with the light intensity detector.

6. A display method, comprising:
displaying information;
changing transmittances of a plurality of light adjustment devices to adjust an intensity of light incident from outside, the plurality of light adjustment devices being arranged in a direction of incidence of the light incident from the outside;
controlling the transmittances of the plurality of light adjustment devices separately from each other, wherein the controlling step comprises simultaneously changing the transmittances of the plurality of light adjustment devices by controlling a time and a magnitude of a voltage applied to the plurality of light adjustment devices, based on a predetermined adjustment table; and
adjusting a transmission intensity of the light with the plurality of light adjustment devices in accordance with the information.

* * * * *